United States Patent
Park et al.

(10) Patent No.: US 7,471,364 B2
(45) Date of Patent: Dec. 30, 2008

(54) MULTI-CELL GAP FRINGE FIELD SWITCHING MODE LCD

(75) Inventors: Jun Baek Park, Kyoungki-do (KR); Kwi Hyun Kim, Kyoungki-do (KR)

(73) Assignee: HYDIS Technologies Co., Ltd., Gyeonggi-do (KR)

( * ) Notice: Subject to any disclaimer, the term of this patent is extended or adjusted under 35 U.S.C. 154(b) by 578 days.

(21) Appl. No.: 11/135,702

(22) Filed: May 24, 2005

(65) Prior Publication Data

US 2006/0164584 A1   Jul. 27, 2006

(30) Foreign Application Priority Data

Jan. 27, 2005   (KR) .................. 10-2005-0007700

(51) Int. Cl.
 *G02F 1/1333* (2006.01)
(52) U.S. Cl. ....................... 349/138; 349/141
(58) Field of Classification Search ............ 349/138, 349/139, 141, 143, 43, 123, 114, 106, 113
See application file for complete search history.

(56) References Cited

U.S. PATENT DOCUMENTS 6,781,657 B1 *   8/2004   Kim et al. ............... 349/129

* cited by examiner

*Primary Examiner*—Thoi V Duong

(57) ABSTRACT

A multi-cell gap fringe field switching mode LCD includes an upper substrate having an overcoat film and a lower substrate having a counter electrode and a pixel electrode successively formed thereon with a gate insulation film interposed between them. The overcoat film is patterned in such a manner that the cell gap at the center of the pixel electrode is different from that at the edge thereof and the overcoat film has a convex pattern formed on a part thereof corresponding to the center of the pixel electrode in a slanted profile and a concave pattern formed on a part thereof corresponding to the edge of the pixel electrode to optimize the driving voltage and phase delay value (Δnd) in each position of the pixel electrode.

6 Claims, 4 Drawing Sheets

MULTI-CELL GAP FRINGE FIELD SWITCHING MODE LCD

BACKGROUND OF THE INVENTION

1. Field of the Invention

The present invention relates to an LCD, and more particularly to a fringe field switching mode LCD capable of realizing high transmittance.

2. Description of the Prior Art

A fringe field switching mode LCD has a counter electrode and a pixel electrode made of a transparent conductor and the spacing between them is smaller than that of upper and lower substrates to establish a fringe field above them.

FIG. 1 is a sectional view showing a fringe field switching mode LCD according to the prior art.

The fringe field switching mode LCD, as shown in FIG. 1, has lower and upper substrates 1 and 2 facing each other with a predetermined spacing between them and a liquid crystal (not shown) interposed between them.

The lower substrate 1 has counter electrodes 3 having a predetermined width and spaced a predetermined distance from each other, a gate insulation film 5 formed thereon, and a pixel electrode 7 formed on the gate insulation film 5. The counter electrodes 3 and the pixel electrode 7 are made of a transparent conductor, for example, ITO (indium tin oxide), and the spacing between them is smaller than the spacing between both substrates (i.e., cell gap).

The upper substrate 2 has a black matrix (not shown), a color matrix (not shown), and an overcoat film 4 formed thereon successively.

Orientation films (not shown) are formed on the uppermost part of the facing surface of the lower substrate 1 and on the surface of the facing surface of the upper substrate 2, respectively, to arrange the liquid crystal molecules in the liquid crystal layer in a batch mode before an electric field is established.

FIGS. 2 and 3 illustrate problems occurring in the prior art.

FIG. 2 is a graph showing V-T characteristics of a pixel electrode for each position in a fringe field switching mode LCD according to the prior art, wherein a refers to V-T curve corresponding to the average of transmittance values from the center to the edge of the pixel electrode, c refers to V-T curve at the center of the pixel electrode, e refers to V-T curve at the edge of the pixel electrode, and $V_{op}$ in the abscissa refers to optimized driving voltage value. FIG. 3 is a graph showing Δnd-T characteristics of a pixel electrode for each position in a fringe field switching mode LCD according to the prior art, wherein a refers to Δnd-T curve corresponding to the average of transmittance values from the center to the edge of the pixel electrode, c refers to Δnd-T curve at the center of the pixel electrode, and e refers to Δnd-T curve at the edge of the pixel electrode.

The fringe field switching mode LCD according to the prior art exhibits different electro-optical characteristics between the center and edge of the pixel electrode 7. As shown in FIG. 2, particularly, the V-T curve (refer to c) at the center of the pixel electrode is similar to that of an in-plane switching (IPS) LCD and the V-T curve (refer to e) at the edge of the pixel electrode is similar to that of a low-twisted TN. As a result, the driving voltage at the center of the pixel electrode is larger than that at the edge of the pixel electrode. It is then impossible to obtain maximum transmittance in both positions of the center and edge of the pixel electrode. This decreases the transmittance.

It is known as a result of simulation that the optimized Δnd (phase delay value) at the center and edge of the pixel electrode is 0.36 and 0.440, respectively, as shown in FIG. 3. However, the Δnd in the fringe field switching mode LCD according to the prior art is 0.38, which is a mean value of both. As such, the conventional fringe field switching mode LCD is not optimized in terms of Δnd either.

SUMMARY OF THE INVENTION

Accordingly, the present invention has been made to solve the above-mentioned problems occurring in the prior art, and an object of the present invention is to provide a multi-cell gap fringe field switching mode LCD having different cell gaps between the center and edge of a pixel electrode to optimize the driving voltage and phase delay value (Δnd) in each position of the pixel electrode for improved average transmittance.

In order to accomplish this object, there is provided a multi-cell gap fringe field switching mode LCD including an upper substrate having an overcoat film and a lower substrate having a counter electrode and a pixel electrode successively formed thereon with a gate insulation film interposed between them, wherein the overcoat film is patterned in such a manner that the cell gap at the center of the pixel electrode is different from that at the edge thereof to optimize the driving voltage and phase delay value (Δnd) in each position of the pixel electrode.

The phase delay value (Δnd) at the center of the pixel electrode is 0.34-0.38 and that at the edge thereof is 0.42-0.46.

The overcoat film is patterned in such a manner that the cell gap between the overcoat film and the edge of the pixel electrode is larger than that between the overcoat film and the center thereof.

The overcoat film is patterned to have a number of concave and convex patterns formed on the surface thereof in a slanted lateral profile so that the cell gap between the overcoat film and the center of the pixel electrode is different from that between the overcoat and the edge thereof.

The overcoat film is patterned to have a concave pattern formed on a part thereof corresponding to the edge of the pixel electrode and a convex pattern formed on a part thereof corresponding to the center of the pixel electrode.

The overcoat film is patterned in such a manner that the bottom surfaces of the concave and convex patterns have a width of 0.5-10 μm.

The cell gap between the overcoat film and the edge of the pixel electrode is larger than that between the overcoat film and the center of the pixel electrode by 0.2-5 μm.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
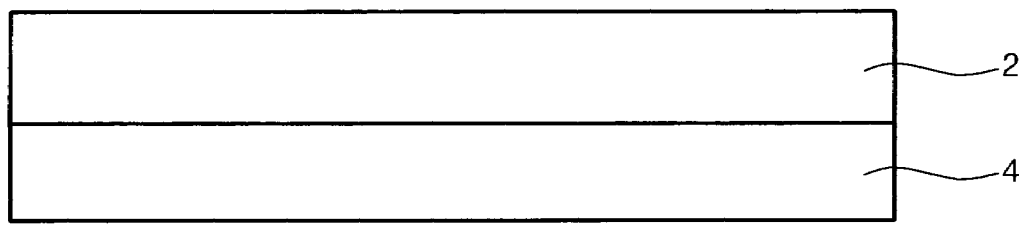
FIG. 1 is a sectional view showing a fringe field switching mode LCD according to the prior art.
Figure 1:
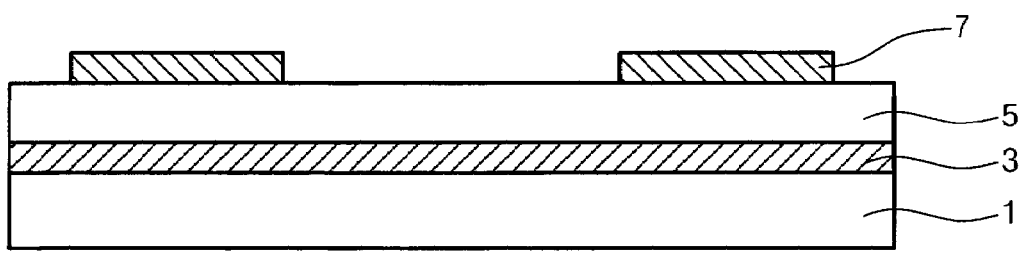
Figure 2:
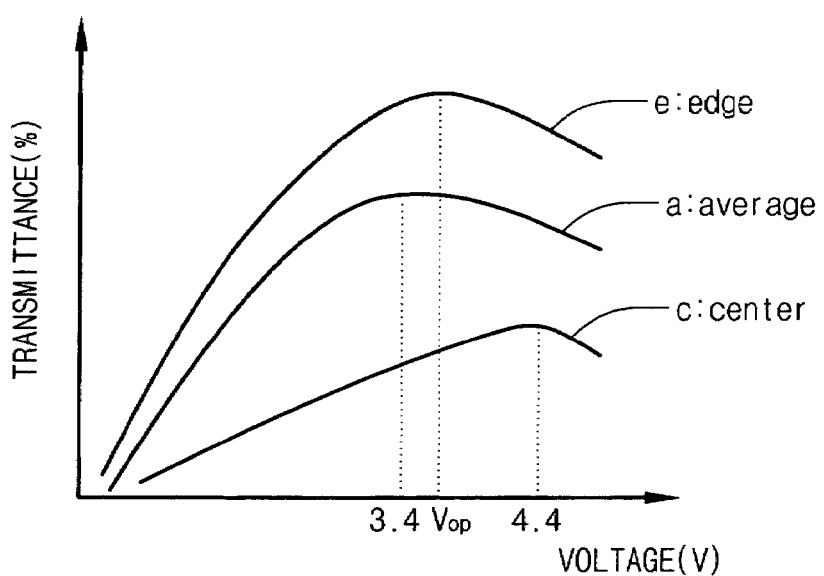
FIG. 2 is a graph showing V-T characteristics of a pixel electrode for each position in a fringe field switching mode LCD according to the prior art.
Figure 3:
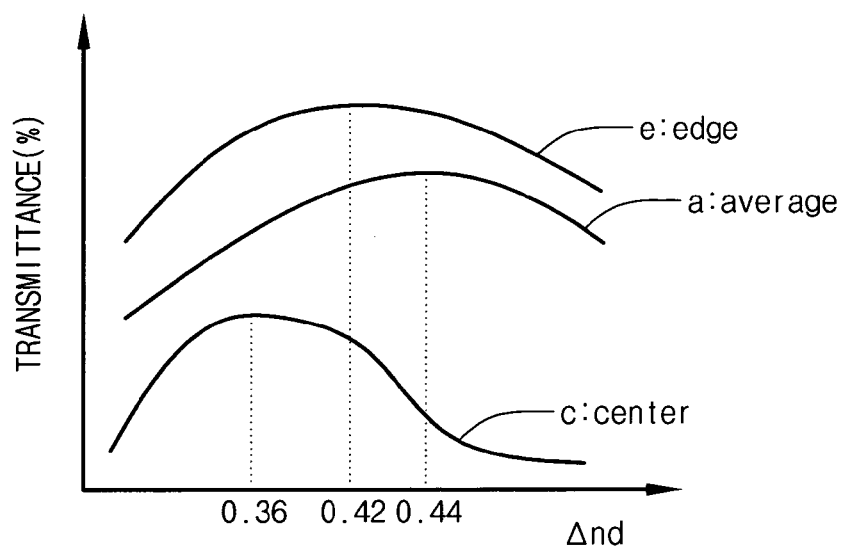
FIG. 3 is a graph showing Δnd-T characteristics of a pixel electrode for each position in a fringe field switching mode LCD according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

The present invention is directed to optimizing the driving voltage and phase delay value ($\Delta$nd) in each position of a pixel electrode for improved average transmittance by forming a pattern on the overcoat film of the upper substrate in a predetermined shape to obtain different cell gaps between the center and edge of the pixel electrode.

Figure 4:
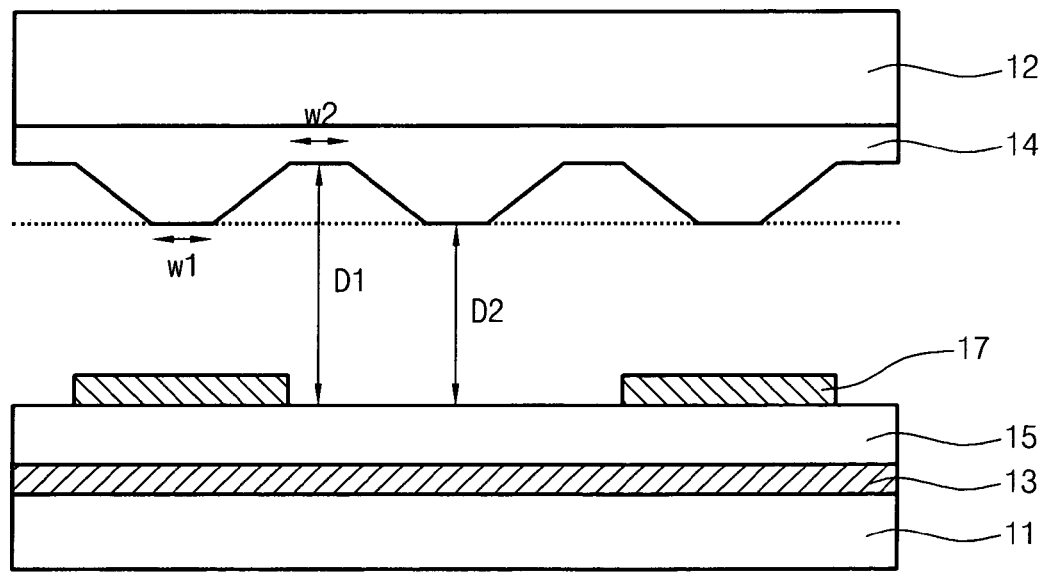
FIG. 4 is a sectional view showing a multi-cell gap fringe field switching mode LCD according to the present invention.

FIG. 4 is a sectional view showing a multi-cell gap fringe field switching mode LCD according to the present invention.

The multi-cell gap fringe field switching mode LCD according to the present invention, as shown in FIG. 4, has lower and upper substrates 11 and 12 facing each other with a predetermined spacing between them, as well as a liquid crystal (not shown) interposed between them.

The lower substrate 11 has counter electrodes 13 having a predetermined width and spaced a predetermined distance from each other, a gate insulation film 15 formed thereon, and a pixel electrode 17 formed on the gate insulation film 15. The counter electrodes 13 and the pixel electrode 17 are made of a transparent conductor, for example, ITO (indium tin oxide), and the spacing between them is smaller than the spacing between both substrates (i.e., cell gap).

The upper substrate 12 has a black matrix (not shown), a color matrix (not shown), and an overcoat film 14 formed thereon successively. The overcoat film 14 has a pattern formed thereon in a predetermined shape to obtain different cell gaps between the center and edge of the pixel electrode 17 and optimize the driving voltage and phase delay value ($\Delta$nd) in each position of the pixel electrode 17. Specifically, the overcoat film 14 has a convex pattern formed in a slanted lateral profile on a part thereof corresponding to the center of the pixel electrode 17 and a concave pattern formed in a slanted lateral profile on a part thereof corresponding to the edge of the pixel electrode 17.

More specifically, the overcoat film 14 is patterned in such a manner that the cell gap D1 between the bottom surface of the concave pattern and the edge of the pixel electrode 17 is larger than the cell gap D2 between the bottom surface of the convex pattern and the center of the pixel electrode 17 by 0.2-5 µm.

The bottom surfaces of the concave and convex patterns of the overcoat film 14 have a width of 0.5-10 µm.

The phase delay value ($\Delta$nd) of the pixel electrode at the center thereof is 0.34-0.38 and that at the edge thereof is 0.42-0.46.

Orientation films (not shown) are formed on the uppermost part of the facing surface of the lower substrate 11 and on the surface of the facing surface of the upper substrate 12, respectively, to arrange the liquid crystal molecules in the liquid crystal layer in a batch mode before an electric field is established.

Figure 5:
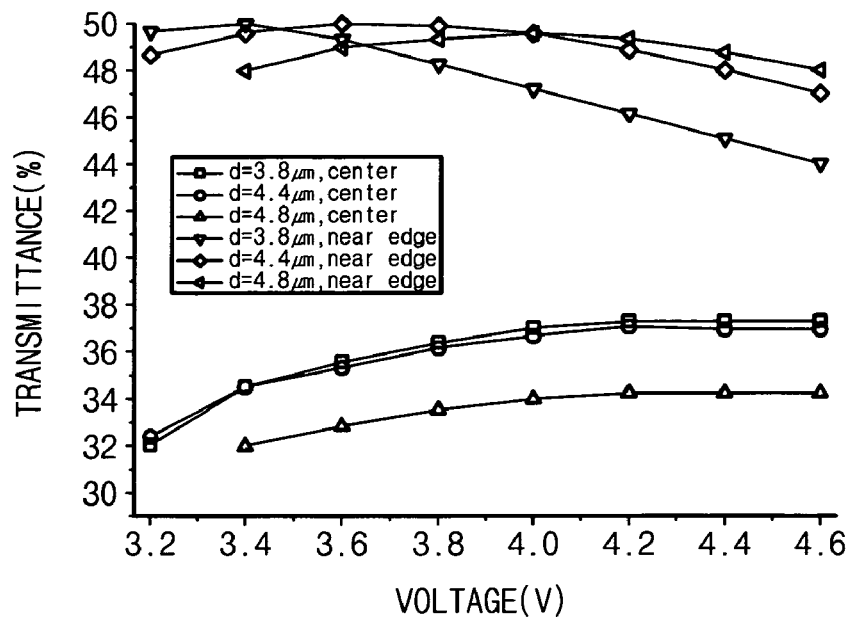
FIG. 5 is a graph showing V-T characteristics of a pixel electrode for each position as the cell gap varies, using 2-Dmos, in a multi-cell gap fringe field switching mode LCD according to the present invention.

FIG. 5 is a graph showing V-T characteristics of a pixel electrode for each position as the cell gap varies, using 2-DIMmos, in a multi-cell gap fringe field switching mode LCD according to the present invention.

It is clear from FIG. 5 that, as the cell gap is increased, the driving voltage at the edge of the pixel electrode increases and approaches that of the center thereof and the slope of transmittance reduction becomes gentle after the driving voltage.

Figure 6:
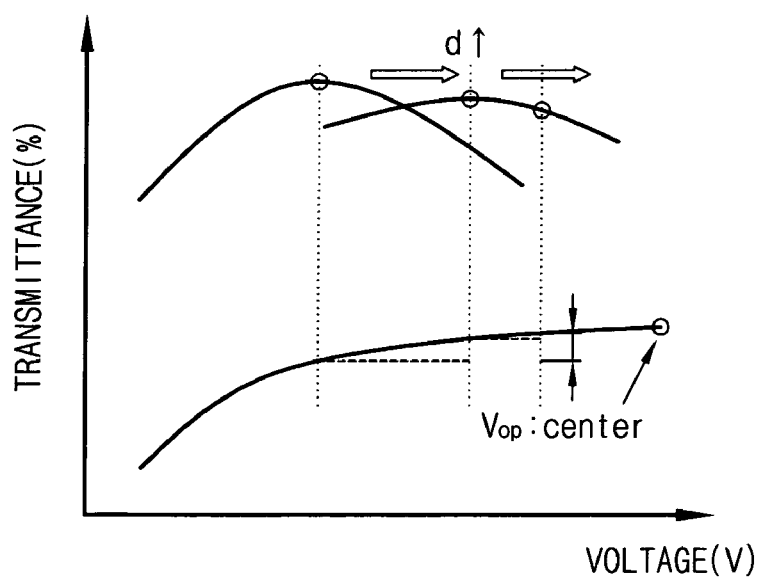
FIG. 6 is a graph showing the concept of optimizing V-T curve of a pixel electrode for each position, as the cell gap d varies, in a multi-cell gap fringe field switching mode LCD according to the present invention.

FIG. 6 is a graph showing the concept of optimizing V-T curve of a pixel electrode for each position, as the cell gap d varies, in a multi-cell gap fringe field switching mode LCD according to the present invention.

As the cell gap d between the overcoat film and the edge of the pixel electrode is increased according to the present invention, the phase delay value at the edge of the pixel electrode is shifted to near 0.42-0.46 and, as shown in FIG. 6, the driving voltage of the V-T curve at the edge of the pixel electrode approaches 4.4V, which is the driving voltage at the center of the pixel electrode. This means that higher transmittance is obtained at the center of the pixel electrode and that, after the driving voltage at the edge thereof, reduction in transmittance decreases and higher transmittance is obtained at the edge. In addition, the driving voltage can be further shifted to near the driving voltage at the center of the pixel electrode. As a result, the liquid crystal power near the driving voltage can be stably maintained.

Figure 7:
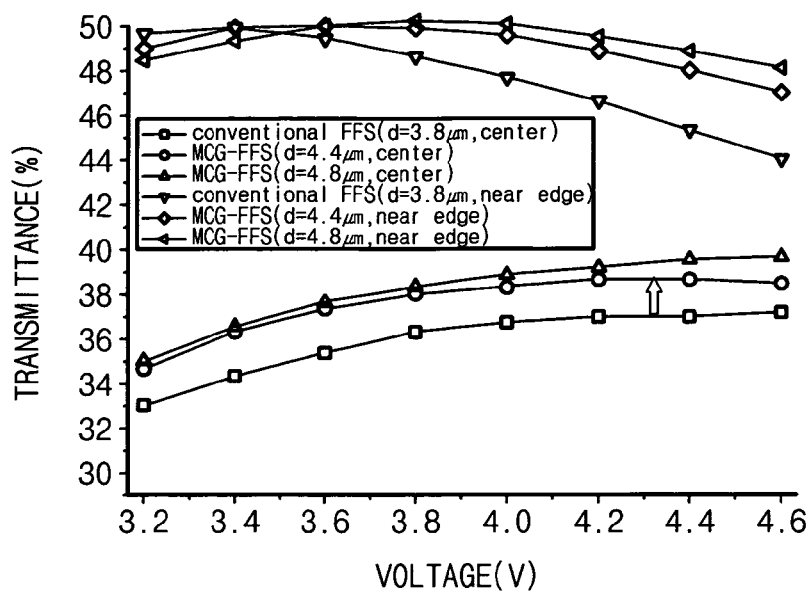
FIG. 7 is a graph showing V-T curve corresponding to the average of transmittance values from the center to the edge of a pixel electrode, as the cell gap d varies, for comparison between the prior art and the present invention.

FIG. 7 is a graph showing each V-T curve at the center and edge of a pixel electrode in a fringe field switching mode LCD according to the prior art and a multi-cell gap fringe field switching mode LCD according to the present invention. It is clear from FIG. 7 that, as the cell gap D1 between the overcoat film and the edge of the pixel electrode is increased, the driving voltage at the edge of the pixel electrode increases and the slope of transmittance becomes gentle. In addition, the maximum transmittance increases without any change of the driving voltage at the center of the pixel electrode. This is because the decrease in tilt-up effect caused by increased cell gap at the edge of the pixel electrode increases the relative twist force.

Figure 8:
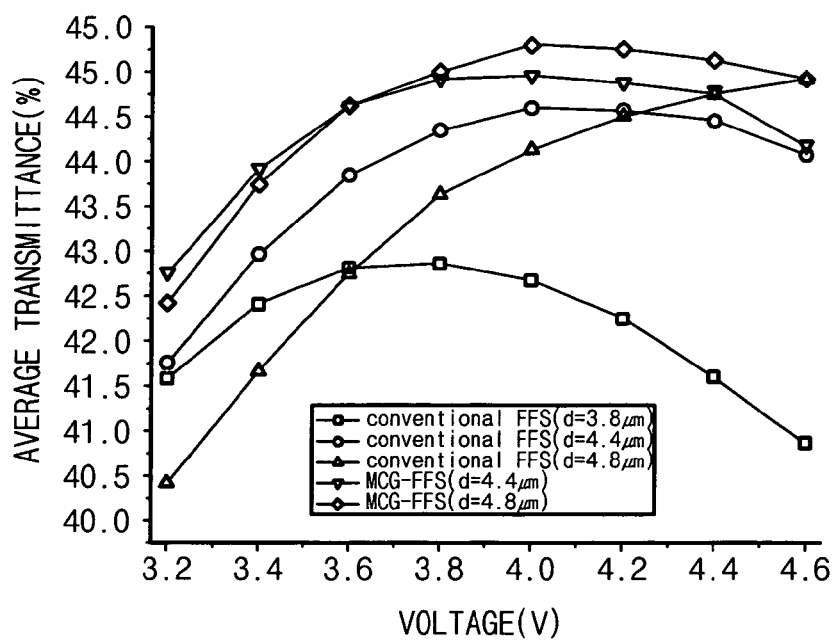
FIG. 8 is a graph showing the average of transmittance values from the center to the edge of a pixel electrode, as the cell gap varies, for comparison between the prior art and the present invention.

FIG. 8 is a graph showing the average of transmittance values from the center to the edge of a pixel electrode in a fringe field switching mode LCD according to the prior art, as well as in a multi-cell gap fringe field switching mode LCD according to the present invention. It is clear from FIG. 8 that the multi-cell gap fringe field switching mode LCD according to the present invention has slightly increased driving voltage and substantially increased average transmittance compared with the fringe field switching mode LCD according to the prior art.

As mentioned above, the inventive multi-cell gap fringe field switching mode LCD has a pattern formed on the overcoat film of the upper substrate in a predetermined shape to obtain different cell gaps between the center and edge of the pixel electrode and optimize the driving voltage and phase delay value ($\Delta$nd) in each position of the pixel electrode for improved average transmittance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fringe field switching mode LCD comprising:
an upper substrate having an overcoat film and
a lower substrate having a counter electrode and a pixel electrode successively formed thereon with a gate insulation film interposed between them,
wherein the overcoat film is patterned to have concave and convex patterns formed on the surface thereof so that the cell gap between the overcoat film and the edge of the pixel electrode is larger than that between the overcoat film and the center thereof, to optimize the driving voltage and phase delay value ($\Delta nd$) in each position of the pixel electrode.

2. The fringe field switching mode LCD as claimed in claim 1, wherein the phase delay value ($\Delta nd$) at the center of the pixel electrode is 0.34-0.38 and that at the edge thereof is 0.42-0.46.

3. The fringe field switching mode LCD as claimed in claim 1, wherein the overcoat film is patterned to have a number of concave and convex patterns formed on the surface thereof in a slanted lateral profile.

4. The fringe field switching mode LCD as claimed in claim 3, wherein the overcoat film is patterned to have a concave pattern formed on a part thereof corresponding to the edge of the pixel electrode, a convex pattern formed on a part thereof corresponding to the center of the pixel electrode, and a convex pattern formed on a part thereof corresponding to the space between the pixel electrodes.

5. The fringe field switching mode LCD as claimed in claim 3, wherein the overcoat film is patterned in such a manner that the bottom surfaces of the concave and convex patterns have a width of 0.5-10 μm.

6. The fringe field switching mode LCD as claimed in claim 1, wherein the cell gap between the overcoat film and the edge of the pixel electrode is larger than that between the overcoat film and the center of the pixel electrode by 0.2-5 μm.

* * * * *